Figure 1:
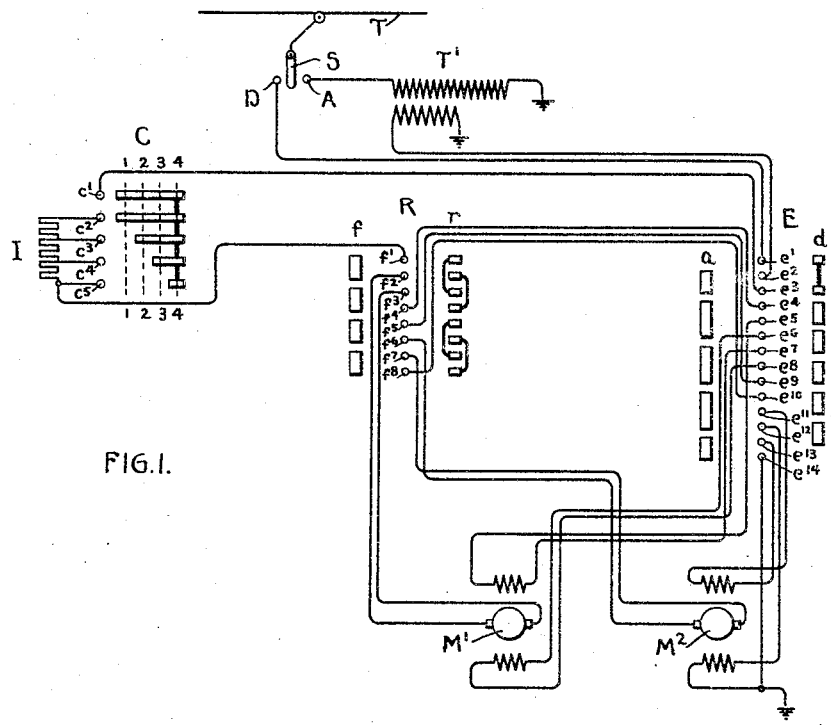

No. 783,124. PATENTED FEB. 21, 1905.
M. MILCH.
MOTOR CONTROL SYSTEM.
APPLICATION FILED AUG. 10, 1904.

Witnesses.

Inventor.
MAURICE MILCH
by
Atty.

No. 783,124. Patented February 21, 1905.

UNITED STATES PATENT OFFICE.

MAURICE MILCH, OF SCHENECTADY, NEW YORK, ASSIGNOR TO GENERAL ELECTRIC COMPANY, A CORPORATION OF NEW YORK.

MOTOR-CONTROL SYSTEM.

SPECIFICATION forming part of Letters Patent No. 783,124, dated February 21, 1905.

Application filed August 10, 1904. Serial No. 220,167.

*To all whom it may concern:*

Be it known that I, MAURICE MILCH, a subject of the Emperor of Austria-Hungary, residing at Schenectady, county of Schenectady, State of New York, have invented certain new and useful Improvements in Motor-Control Systems, of which the following is a specification.

The present invention relates to control of motors which are designed to be operated either from a direct-current or an alternating-current source.

In railway systems at the present time the standard system is a direct-current system and the standard voltage is in the neighborhood of six hundred volts. For interurban traffic, where the power must be transmitted over long distances, an alternating-current system is more efficient, for the reason that high-potential currents may be transmitted over long distances with less loss than would be the case with low-tension direct current, the high-tension alternating being transformed in order to give the proper potential for the motors. Where cars or trains are to be operated for both local traffic and for long-distance runs between towns, it is desirable to so design the motors and to so organize the control system that a car or train may be successfully and efficiently operated on both direct and alternating currents. To accomplish this end, the simplest thing to do would be to design a motor which would operate satisfactorily either on the usual six-hundred-volts direct current or six-hundred-volts alternating current; but this is difficult for two reasons. In the first place the difficulties of commutation are greatly increased by the use of alternating currents, since the coil undergoing commutation incloses an alternating field which tends to set up large induced currents in the short-circuited turns, and in the second place a motor which is properly designed to operate at a certain voltage on alternating current will be considerably overloaded if supplied with direct current at the same voltage. The reason for this is that on alternating current the counter electromotive force of the motor consists not only of that induced by the rotation of the armature, but also of the self-induction of the motor-circuits, particularly the field. When the motor is connected to a direct-current source, this self-induction does not exist, and consequently the counter electromotive force must be raised a considerable amount in order to balance the impressed voltage. This means that the motor will take more current and will operate at a higher speed, or, in other words, the motor will be heavily overloaded.

In the design of series motors for railways, whether they are to be operated on direct or alternating current, the voltage which may be safely employed is limited because of the difficulty of successfully commutating a very high voltage current under practical running conditions. In direct-current work with motor constructions now in use this limiting voltage is in the neighborhood of six hundred volts, and for this reason the standard voltage in direct-current systems is approximately six hundred volts. When a similar motor is operated from a source of alternating-current supply, the limiting voltage is in the neighborhood of two hundred volts. If a motor which is designed to operate on two hundred volts alternating is supplied with direct current at the same voltage, it will be overloaded, as explained above, and if two such motors are connected in series and supplied with direct current at six hundred volts there will be still more overload, since each motor will have three hundred volts at its terminals.

The present invention consists in so designing the motor and the control systems that the motors may be satisfactorily operated without overloading when they are connected with the direct-current source.

More specifically considered, my invention consists in providing each of a plurality of motors with a field-winding divided into a plurality of sections, and arranging the control system to connect the field-winding sections of each motor in multiple when the motors are connected to the alternating-current source, and to connect the motors two in series with the field-winding sections of each motor also connected in series when the motors are connected to the direct-current source.

In carrying my invention into effect I provide on the car or train a transforming device for reducing the alternating-current-line voltage to a value such that each motor may be operated under an impressed voltage in the neighborhood of two hundred volts. I then so arrange the control system and the field connections of the motors that the motors may be connected two in series for direct-current operation, with the field connections so changed that the motor will have speed and torque characteristics suitable for the particular case in hand. If the voltage of the direct-current source is in the neighborhood of six hundred volts, I find that I am able to accomplish this object most satisfactorily by dividing the field-windings of the motors into two sections, which are connected in series when the motors are operated as direct-current motors and in parallel when they are operated as alternating-current motors. This arrangement renders it possible to operate the motor as an alternating-current motor with a comparatively small number of ampere-turns on the field—a condition which is essential for efficient operation—and to double the number of field-turns in working on direct current. The motors are thus operated on direct current with the field strength great enough to prevent overloading, and on alternating current with a field strength low enough to give the most efficient operation.

One embodiment of the present invention is illustrated in the accompanying drawings, in which—

Figure 2:
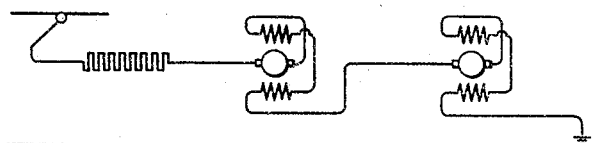
Figure 3:
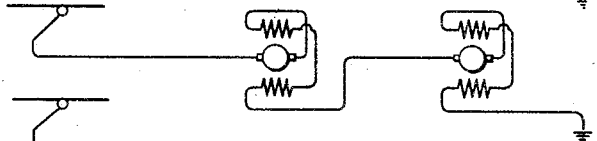
Figure 4:
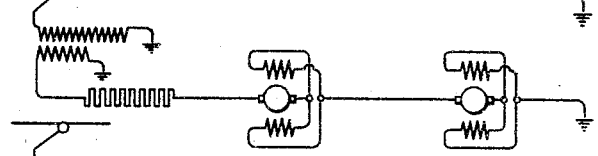
Figure 5:
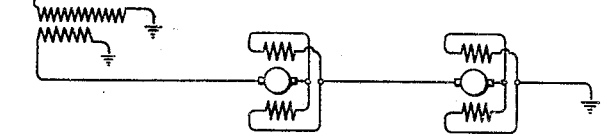

Figure 1 represents diagrammatically a system arranged in accordance with my invention. Figs. 2 and 3 indicate the motor connections when the equipment is being operated on direct current with full resistance and with no resistance, respectively, in the motor-circuit; and Figs. 4 and 5 are views corresponding to Figs. 2 and 3, but illustrating the equipment as operating on alternating current.

Similar reference characters will be used to denote like parts throughout the specification and drawings.

M' and M² represent two motors designed for operation on either direct or alternating current.

C indicates a speed-controlling switch, which, as shown, is arranged to connect the motor-circuit to the source of current-supply and to vary the amount of the resistance I in the motor-circuit.

R is a reversing-switch of any usual or preferred type whereby the relative connections of the fields and armatures of the motors may be reversed in order to provide for rotation in either direction.

T' is a transformer located on the car or other vehicle for transforming high-tension to low-tension alternating current suitable to the conditions existing in the particular situation.

T is a trolley or other source of current-supply.

S indicates a switch through which the motors may be supplied with current taken directly from the trolley or which serves to connect the trolley with the primary of transformer T', the motors being in the latter case supplied with current from the secondary of transformer T'.

E represents a switch whereby the proper changes may be produced in the motor-fields to adapt the motors to run either on direct or alternating current. In the embodiment of my invention illustrated this switch, which I shall hereinafter designate the "commutating-switch," serves to connect the two halves of the motor-fields in parallel when operating on alternating current and in series when operating on direct current. By this arrangement the result is, in effect, the doubling of the number of turns in the field-winding when running on direct current, and thereby strengthening the field relatively in like proportion.

When it is desired to operate the motors on direct current, switch S is placed upon contact D and the commutating-switch is positioned with its row of contacts $d$ in line with the fixed contacts $e'-e^{14}$. Assume that it is desired to propel the car forwardly. Then the reversing-switch is moved so as to bring its line of contacts $f$ into registration with the line of fixed contacts $f'-f^8$. If now the controller is moved to the first position, bringing the line 1 1 into registration with the line of fixed contacts $c'-c^5$, the following circuit may be traced: from the trolley through switch-point D, contacts $c'$ and $c^3$, contact $c'$, contact $c^2$, resistance I, contacts $f'$ and $f^2$, armature of motor M', contacts $f^3$ and $f^4$, contacts $e^4$ and $e^5$; upper half of field of motor M, contacts $e^7$ and $e^6$, lower half of field of motor M', contacts $e^8$ and $e^9$, contacts $f^5$ and $f^6$, armature of motor M², contacts $f^7$ and $f^8$, contacts $e^{10}$ and $e^{11}$, upper half of field of motor M², contacts $e^{13}$ and $e^{12}$, lower half of field of motor M², to the ground. Therefore the motors are connected in series with the halves of the field-windings also in series, all of the resistance I being included in circuit with the motors. These conditions are indicated in Fig. 2. Now as the controller is moved to and through its several positions, so as to bring the movable contacts successively into engagement with the fixed contacts along the lines 2 2, 3 3, and 4 4, it is evident that no changes are produced in the motor connections, but that the sections of the resistance I are progressively cut out until, when the controller is in the extreme running position, the resistance is short-circuited. The conditions are now as indicated in Fig. 3. Upon opening the switch S and returning the controller to its off position the motor-circuit is broken both at switch S and at contact $c'$.

When it is desired to run the motors on alternating current, the commutating-switch is placed in the position in which its row of contacts $a$ registers with the line of fixed contacts $e'-e^{14}$ and the switch S is placed on contact A. In this position of switch S it is seen that the trolley-current passes through the primary of transformer T' to ground. The motors will now be supplied with current from the secondary of transformer T', one terminal of which is grounded, as shown. Now assuming that the reversing-switch is positioned as before, thereupon upon moving the controller to its first position the following circuits may be traced: from secondary of transformer to contact $e^2$, contact $e^3$, contacts $c'$ and $c^2$, resistance I, contacts $f'$ and $f^2$, armature of motor M', contacts $f^3$ and $f^4$. Here instead of passing to contact $e^5$, as before, the current divides, one portion flowing through contact $e^5$, upper half of field of motor M', to contact $e^7$, and the other portion going through contact $e^6$, lower half of field of motor M', to contact $e^8$. Here the current again unites and passes out of contact $e^9$ to contacts $f^5$ and $f^6$, armature of motor M², contacts $f^7$ and $f^8$, to contact $e^{10}$. Here, again, instead of passing to contact $e^{11}$, as before, the current divides, a portion only flowing through contact $e^{11}$, upper half of field-motor M², to contacts $e^{13}$ and $e^{14}$, to ground, and the other portion flowing through contact $e^{12}$, lower half of field-motor M², to ground. The motors are now connected in series with all resistance in circuit, as before; but the two halves of the field of each motor are connected in parallel with only half the exciting capacity per ampere. These connections are illustrated in Fig. 4. Upon moving the controller through the various positions, as before, the sections of resistance I are cut out step by step until the motors are running on full voltage, as represented in Fig. 5.

It is obvious that for reverse rotation, either on alternating or direct current, the placing of the reversing-switch so that its contacts $r$ register with the line of contacts $f'-f^8$ the motor connections and circuits will be the same as those described for forward movements, except that the direction in which the current is admitted to the armatures is reversed.

While I have described my present invention as embodied in a railway system, and while it is particularly well adapted to the conditions obtaining in such a system, I desire it to be understood that the present invention is not limited in its use to railway and car equipments, but may be employed wherever it is desired to operate motors on both direct and alternating current. Furthermore, the specific arrangements of switches and controllers illustrated and described have been employed herein simply for the purpose of clearly and concisely explaining my invention, and not because the invention is confined in its scope thereto. On the other hand, I aim to cover all modifications which are within the scope of my invention as defined in the claims.

Having described my invention, I claim as new and desire to protect by Letters Patent of the United States—

1. In combination, an electric motor, a source of direct current, a source of alternating current, means for connecting said motor to either source, and means for varying the number of turns of the field-winding when said motor is transferred from one source to the other.

2. In combination, a motor adapted for operation on either alternating or direct current, and means for increasing the number of turns of the field-winding when changing it from alternating to direct current.

3. In combination, a motor adapted for operation on either alternating or direct current, and a control system adapted and arranged to vary the relative connections of portions of the field-winding of the motor to increase the number of its field-turns when changing it from alternating to direct current.

4. In combination, a series motor adapted for operation on either alternating or direct current, and a control system adapted to connect portions of the field-winding in parallel for operation on alternating current and in series for operation on direct current.

5. In combination, an electric motor adapted for operation on either alternating or direct current, and a control system comprising a speed-controlling switch and a switch adapted to increase the number of field-turns of said motor when changing it from alternating to direct current.

6. In combination, a plurality of series motors adapted for operation on either alternating or direct current, and a control system arranged to connect said motors to a source of alternating current with the field connections of the motors arranged to give a comparatively small number of ampere-turns and to a direct-current source, two in series, with the field connections modified to give a comparatively large number of ampere-turns.

7. In combination, a plurality of series motors provided with sectional field-windings, and a control system arranged to connect said motors to a source of alternating current with the field-winding sections of each motor connected in parallel and to a direct-current source, two in series, with the field-winding sections of each motor connected in series.

In witness whereof I have hereunto set my hand this 4th day of August, 1904.

MAURICE MILCH.

Witnesses:
BENAJMIN B. HULL,
HELEN ORFORD.